United States Patent
Knost et al.

(10) Patent No.: US 12,345,133 B2
(45) Date of Patent: Jul. 1, 2025

(54) HIGH EFFICIENCY POWER SYSTEM FOR ELECTRIC SUBMERSIBLE PUMPS

(71) Applicants: George Knost, Baton Rouge, LA (US); Michael Gallagher, Clemson, SC (US)

(72) Inventors: George Knost, Baton Rouge, LA (US); Michael Gallagher, Clemson, SC (US)

(*) Notice: Subject to any disclaimer, the term of this patent is extended or adjusted under 35 U.S.C. 154(b) by 87 days.

(21) Appl. No.: 18/281,719

(22) PCT Filed: Mar. 10, 2022

(86) PCT No.: PCT/US2022/019712
§ 371 (c)(1),
(2) Date: Sep. 12, 2023

(87) PCT Pub. No.: WO2022/192516
PCT Pub. Date: Sep. 15, 2022

(65) Prior Publication Data
US 2024/0309735 A1    Sep. 19, 2024

Related U.S. Application Data (60) Provisional application No. 63/160,026, filed on Mar. 12, 2021.

(51) Int. Cl.
*H02M 7/06*     (2006.01)
*E21B 41/00*    (2006.01)
*E21B 43/12*    (2006.01)
*H02P 27/06*    (2006.01)

(52) U.S. Cl.
CPC ........ *E21B 41/0085* (2013.01); *E21B 43/128* (2013.01); *H02P 27/06* (2013.01)

(58) Field of Classification Search
CPC .......... E21B 43/128; H02P 27/06; H02P 9/04
See application file for complete search history.

(56) References Cited

U.S. PATENT DOCUMENTS

2017/0146015 A1* 5/2017 Hawes .................. F04D 29/086

* cited by examiner

*Primary Examiner* — Muhammad S Islam
(74) *Attorney, Agent, or Firm* — Nixon Peabody LLP (57) ABSTRACT

A system for supplying power to an electric submersible pump is provided. The system includes a variable frequency drive connected to a motor. The motor is mechanically connected to the electric submersible pump. A generator and a battery are connected to the variable frequency drive. The battery is appropriately sized so that it can power the variable frequency drive during startup operations of the electric submersible pump and during generator maintenance periods. The system includes a means for detecting when power from the generator is insufficient to meet the load demand of the electric submersible pump. When that occurs, the battery sends power to the variable frequency drive to meet the load demand of the electric submersible pump. The system also includes a means for charging the battery using the generator when the battery has dropped below a threshold level.

6 Claims, 7 Drawing Sheets

Benefits

Eliminates 80% of Refueling Trips
The system eliminates 4 out of 5 refueling tanker trips, significantly reducing road safety exposure.

80% Reduction in Hazardous Handling Activity
80% reduction in potentially hazardous on-site fuel handling activity.

20,000 Tons/Year of Reduced Emissions
Reduce emissions by up to 20,000* tons/year/gen-set of $CO_2$, HC, NOx and Particulate Matter.

Operational Benefits
Higher ESP uptime and lifetime, fewer ESP well hoist interventions, fewer operator site visits.

Logistics
Harmonics elimination, extended maintenance intervals, less field coordination, and remote monitoring and control if required.

No CAPEX
No CAPEX, Operating lease with substantial OPEX savings to self-fund.

*$CO_2$ – 3,400t, HC – 165t, NOx – 11,800t, Particulate Matter – 425t

FIGURE. 6

HIGH EFFICIENCY POWER SYSTEM FOR ELECTRIC SUBMERSIBLE PUMPS

CROSS REFERENCE TO RELATED APPLICATIONS

This application claims priority to U.S. Patent Application Ser. No. 63/160,026 filed on Mar. 12, 2021.

STATEMENT REGARDING FEDERALLY SPONSORED RESEARCH OR DEVELOPMENT

Not Applicable.

REFERENCE TO A "SEQUENCE LISTING," A TABLE, OR A COMPUTER PROGRAM

Not Applicable.

DESCRIPTION OF THE DRAWINGS

The drawings constitute a part of this specification and include exemplary embodiments of the High Efficiency Power System for Electric Submersible Pumps, which may be embodied in various forms. It is to be understood that in some instances, various aspects of the invention may be shown exaggerated or enlarged to facilitate an understanding of the invention. Therefore, the drawings may not be to scale.

BACKGROUND

Oil production wells use electric submersible pumps (ESPs) to lift production fluids to the surface. If the well is located in an area where power is available from an electric utility grid, the ESP can be powered from the grid. However, many onshore oil production wells are located in remote areas where the electric grid is not a practical option. Similarly, for offshore oil production wells the electric grid is not available. In those situations, other devices and methods must be used to power the ESPs.

It is known to those skilled in the art that ESPs are preferred for pumping production fluids to the surface. ESPs are especially effective in situations involving low gas/oil ratio, low bottomhole pressure, low bubblepoint, low API (American Petroleum Institute) gravity fluids, or high water cut. ESPs also have low maintenance requirements.

ESPs are versatile because they can handle a wide variety of flow rates and lift requirements. Because of their small size ESPs can be installed in smaller well casing. ESPs are also considered very economical on a cost-per-barrel basis. ESPs are installed downhole in the well itself, reducing the amount of equipment exposed on the surface. This is both esthetically attractive and effective in reducing noise. Additionally, placement in the casing protects the ESP from external damage by weather or intruders.

ESPs can be driven by either a Variable Frequency Drive (VFD) or Variable Speed Drive (VSD). For purposes of this application, when the term VFD is used it is intended to encompass a VSD as well.

When operating in remote locations, the power for VFDs is typically supplied by diesel generators. In current prior art configurations, the diesel generator must be sized so that it can supply all the power required to start the ESP. For a typical ESP, the inrush current required at startup will be 6-8 times the current required to run the motor under a normal load. Prior art diesel generators must also have the capability to increase and decrease the power instantaneously to the VFD and in turn to the ESP as well flow conditions fluctuate in normal operation. The diesel generator must always be running when the ESP is operating. This leads to inherent inefficiencies because the diesel generator must be kept running at lower loads after starting, even when the demand for power from the ESP is reduced. Running at lower loads also causes increased emissions, additional maintenance, and poor power quality performance.

What is needed is a system for supplying power to ESPs that can supply power efficiently at lower loads, continue to supply power if the diesel generator shuts down and supply higher levels of power when needed for starting and other higher load requirements. The instant invention meets those needs.

DETAILED DESCRIPTION

Figure 1:
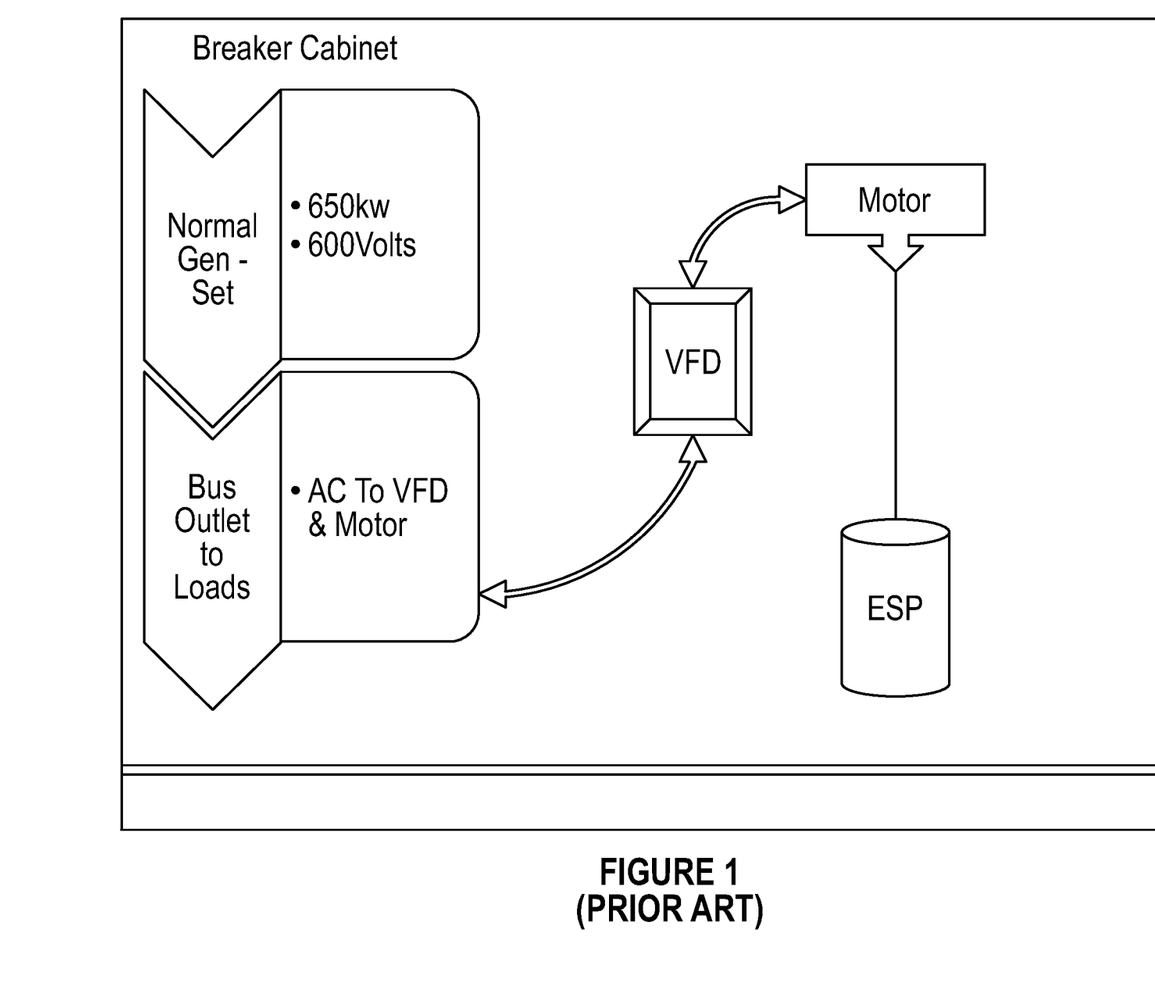
FIG. 1 is a schematic showing the prior art system that is typically used for powering electric submersible pumps in oil production wells.
Figure 2:
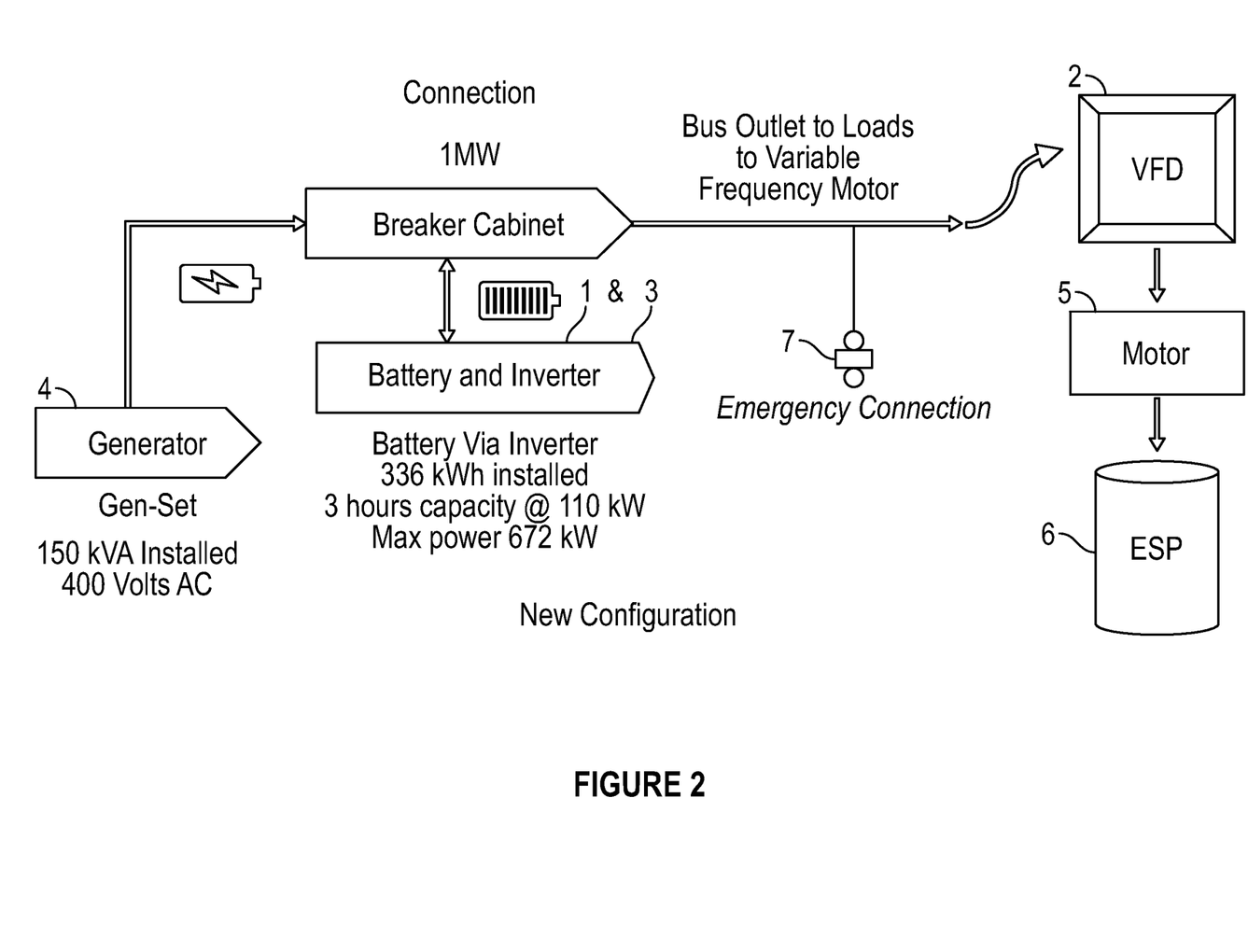
FIG. 2 depicts the new system for powering electric submersible pumps in oil production wells and portrays one preferred embodiment of the invention.

As depicted in FIG. 2, the new High Efficiency Power System for Electric Submersible Pumps will include battery 1 that is electrically connected to VFD 2. In the particular embodiment of FIG. 2, battery 1 will include inverter 3. Battery 1 and inverter 3, along with generator 4, are electrically connected to the load of VFD 2. The key to this novel system is that a smaller diesel generator 4 is used to run the ESP at normal loads. When the ESP has higher load requirements, for example at startup, battery 1 will supply the extra power.

When running at normal loads, generator 4 will also recharge battery 1 when required. The system will include a means for detecting when battery 1 is below a required threshold level of power, and the system will then direct power from generator 4 to battery 1 to charge battery 1.

VFD 2 is in turn electrically connected to motor 5 and motor 5 is mechanically connected to ESP 6. In a particularly preferred embodiment, the system will also include emergency connection 7. Emergency connection 7 is a connection that can supply power in the event both battery 1 and generator 4 are not available, In a preferred embodiment battery 1 will be able to supply 672 kW of max power, and three hours of power at 110 KW per hour. Generator 4 will be a generator capable of supplying 150 kVA of power. Additionally, generator 4 will be able to provide the proper voltage to battery 1. The voltage of the system will be determined by the needs of the ESP motor and transformers. Battery 1 and generator 4 will be sized to start motor 5 with the power of both generator 4 and battery 1, and then have generator 4 run efficiently at the normal required load for ESP 6.

The operation of the system will now be described. In the initial phase of operations, when starting ESP 6, generator 4 will be on. Battery 1 and generator 4 will both supply electric power to VFD 2 for starting operation of ESP 6, due to the higher inrush current required at startup. When the power management system detects that battery 1 is no longer needed to support the load of ESP 6, the system will switch off the electric power from battery 1 that was being supplied to ESP 6. The system will direct power from generator 4 to battery 1 to charge battery 1 back to the required voltage level. In normal, sustained, operations generator 4 will continue to run and supply power to the ESP at a higher more efficient load than found in prior art systems, thus saving fuel and lowering overall emissions.

Battery 1 will continue to cycle on and off as needed to support ESP startup requirements or other load swings. Additionally, power from battery 1 can be used to power ESP 6 when generator 4 is taken offline for maintenance. Having a continuous, uninterrupted, sustained power source for ESP 6 will allow for more continuous operation of ESP 6. This will increase the run time of the ESP and thus the production of the well, and is beneficial to the lifetime of the ESP as starting and stopping is stressful for the ESP.

Figure 5:
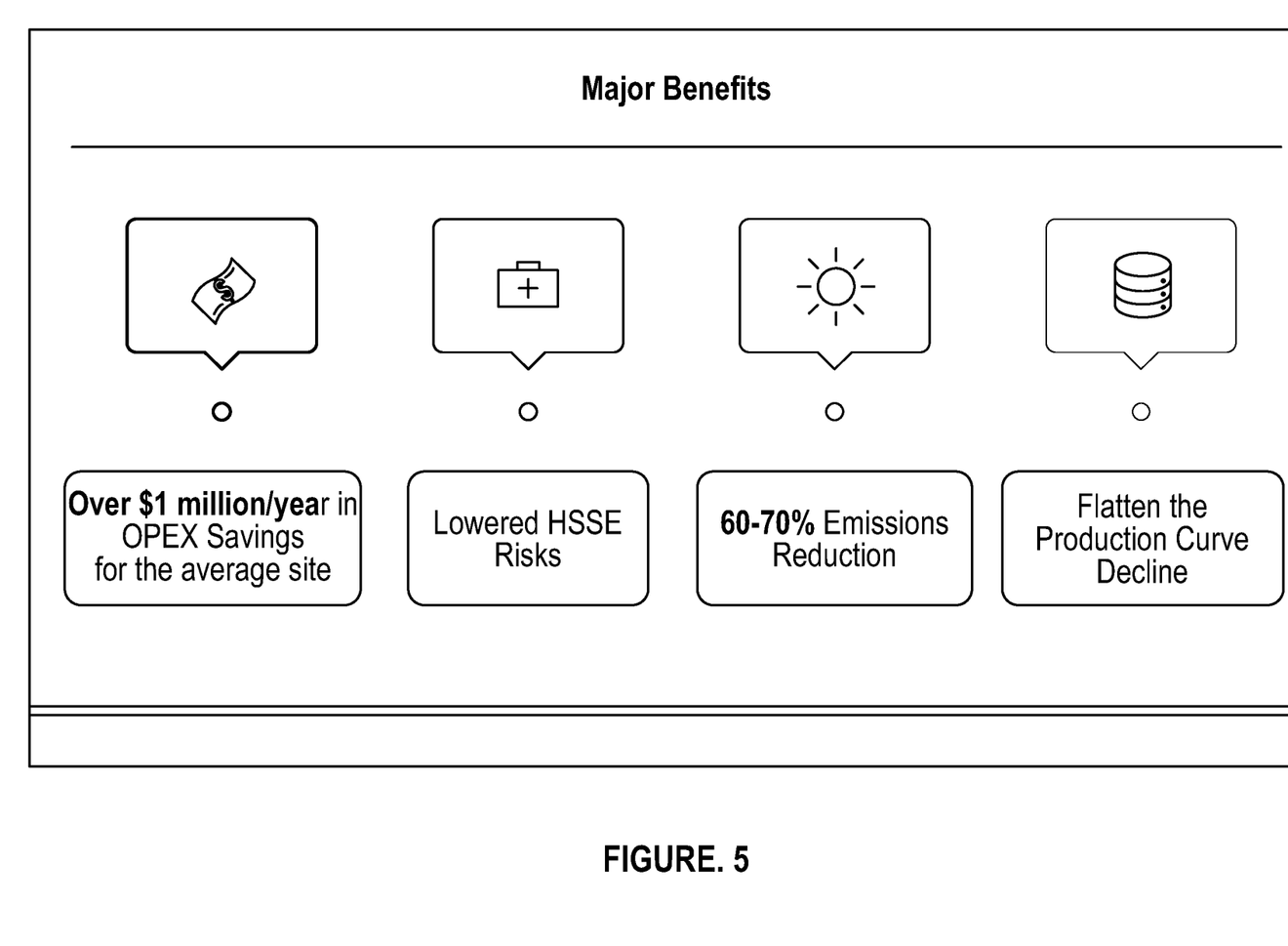
FIG. 5 is a chart providing information about the major benefits provided by the instant invention as compared to the prior art systems.

The instant invention provides several advantages over the prior art systems. As shown in FIG. 5, the instant invention has lower emissions because the diesel generator is smaller and will run at a more efficient load closer to design. Additionally, the battery is sized to support the normal load during generator maintenance. In one preferred embodiment, the instant invention can be used to eliminate the gap in production power that is needed to fill the time between relocation of a drilling rig and permanent power installation. Finally, the instant invention is a mobile and scalable application that provides for flexible operation on end-of-life production fields.

Figure 3A:
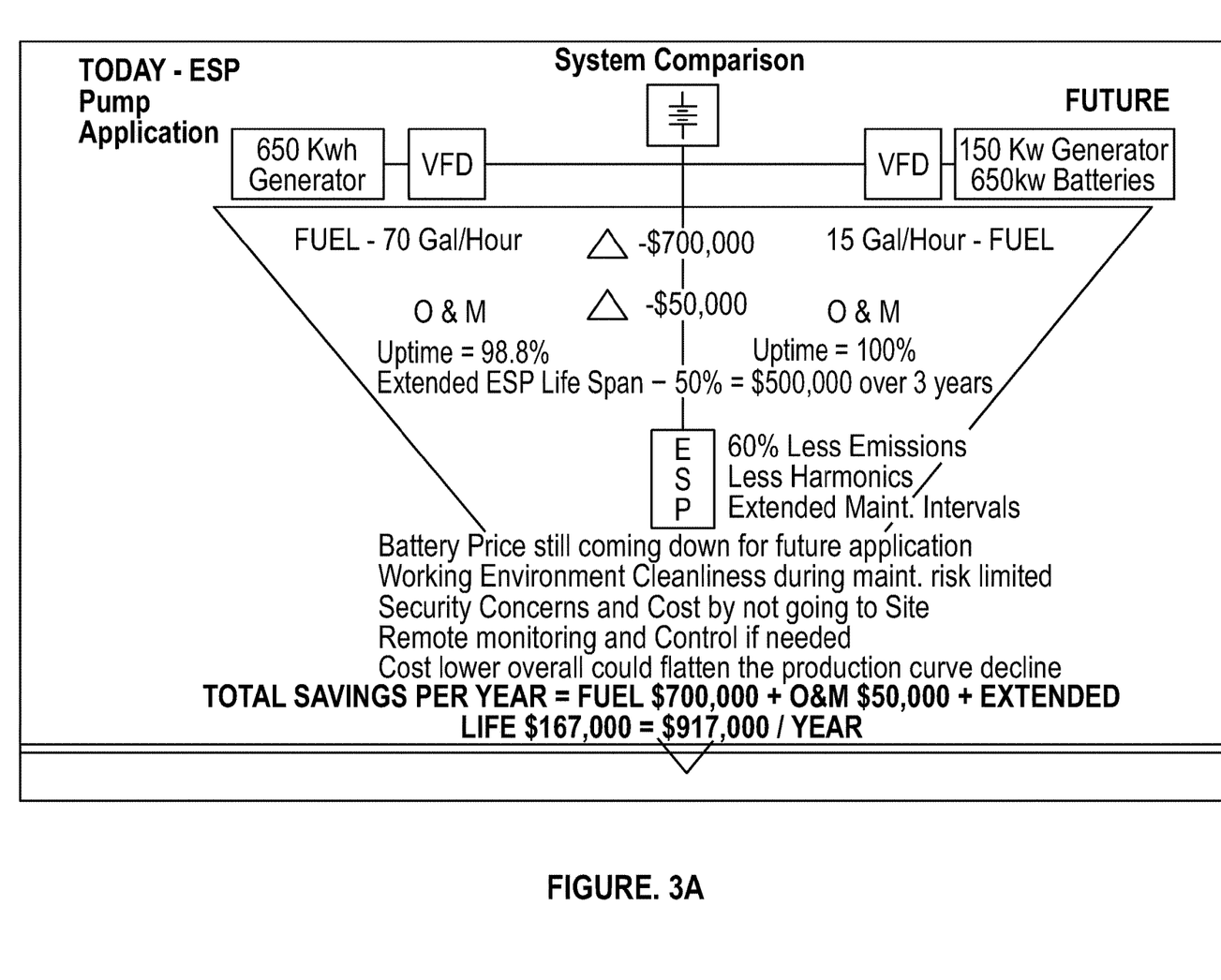
FIG. 3A is a chart providing a comparison of the prior art system to the instant invention.
Figure 3B:
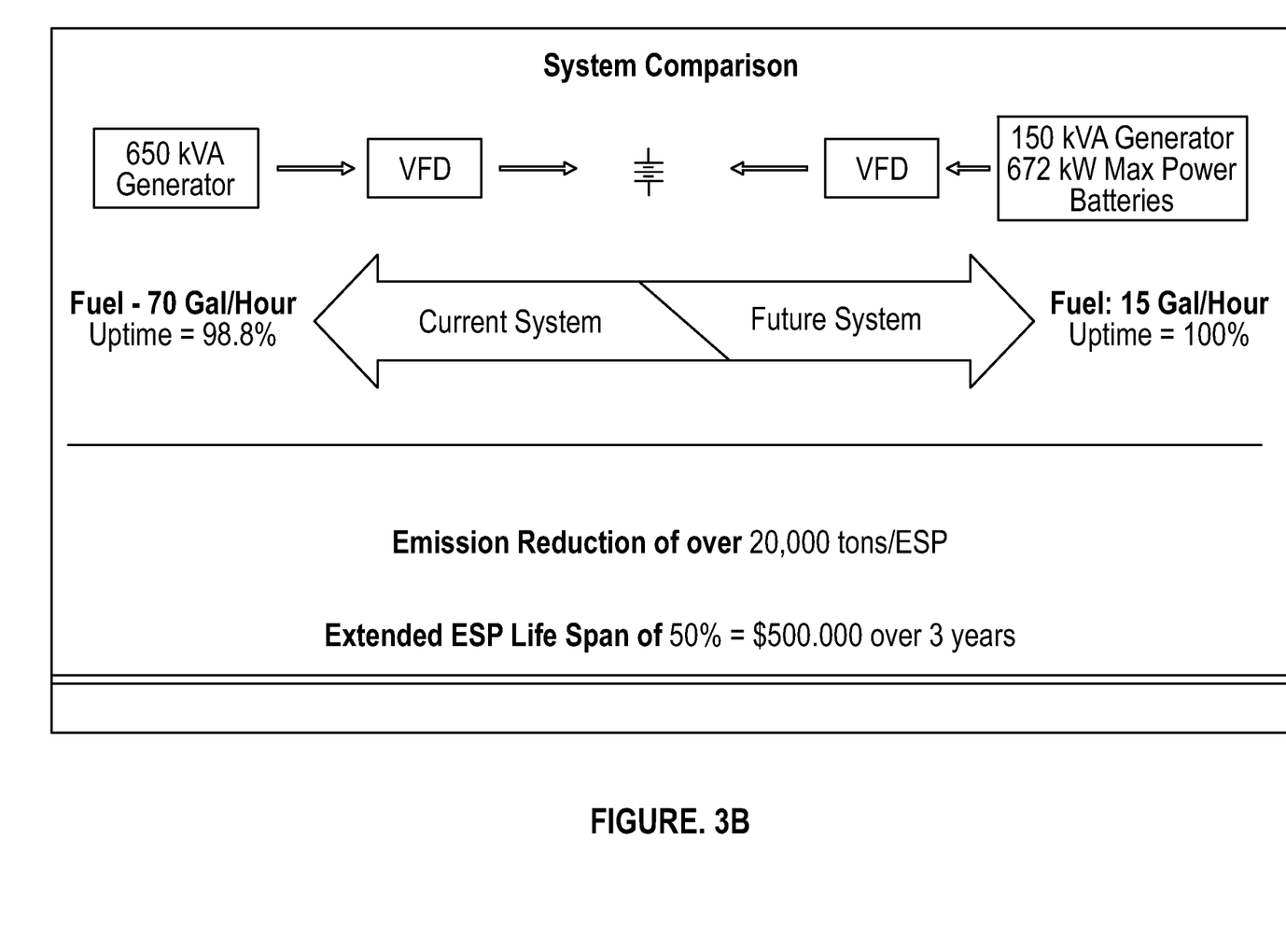
FIG. 3B is a chart providing a comparison of the prior art system to the instant invention.
Figure 4:
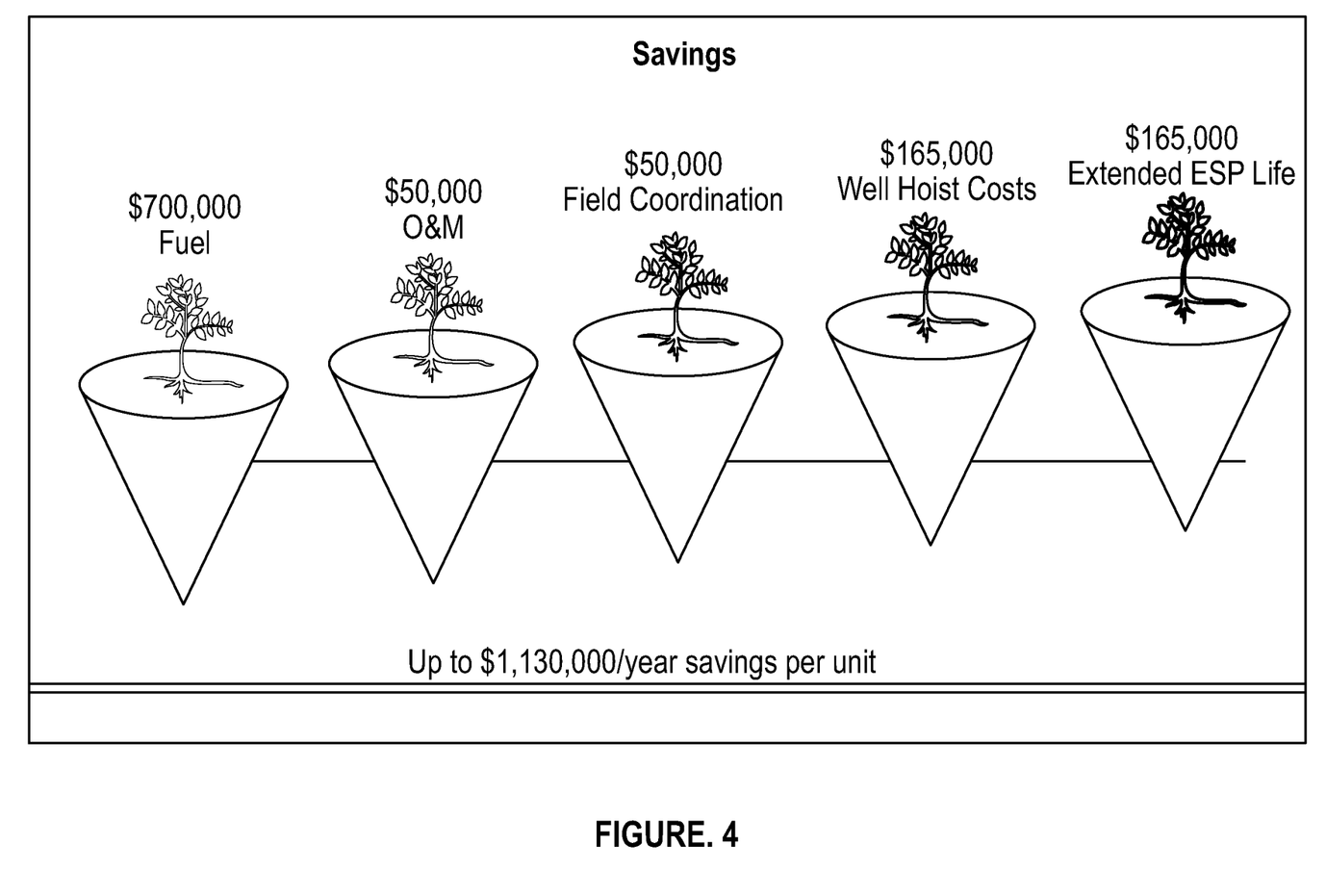
FIG. 4 is a chart providing information about the savings provided by the instant invention as compared to the prior art systems.
Figure 6:
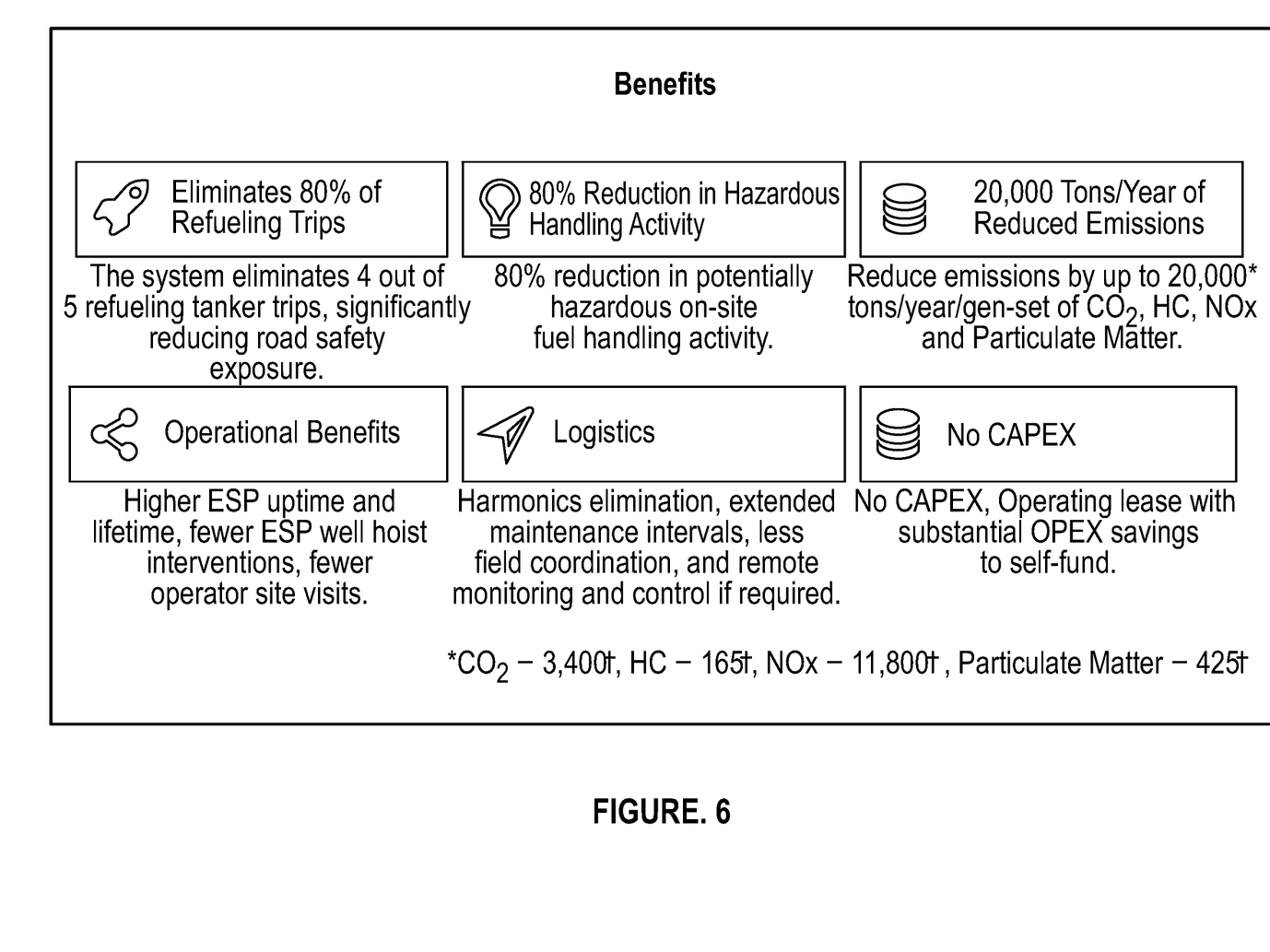
FIG. 6 is a chart providing information about other benefits provided by the instant invention as compared to the prior art systems.

Additional advantages of the instant invention over the prior art systems are shown in the side-by-side comparison of FIG. 3. The 150 KVA generator used in the new system will burn 15 gal/hour as compared to 70 gal/hour burned by the 650 KVA generator used in current systems. As shown in FIG. 4, this results in annual savings in fuel costs of approximately $700,000 per year with typical fuel costs. As discussed in FIG. 6, the instant invention reduces the hazards and costs associated with road tanker refueling by 80%, saving on delivery costs and reducing road traffic safety exposure by 80% This also manifests in improved safety for personnel by instant invention requiring only 20% of the potentially hazardous fuel handling at the well site versus previous art.

The O&M costs are lower because the diesel generator in the new system is smaller and is running in its efficient range while supplying the load of the ESP during normal operations. Additionally, O&M costs for the new system are lower because the system is operating more efficiently and is not operating in situations or at low loads that cause performance and maintenance issues such as wet stacking, etc. Man-power requirements will also be lower because less operations personnel and security will needed if the only component shutdown during routine maintenance on the generator is the generator versus the present requirement to shut down and restart the ESP.

As shown in FIG. 3, the new system will also lead to an Extended ESP Life Span of approximately 50%. This longer lifespan can result in cost savings of approximately $500,000 over 3 years.

The new system has less harmonics and longer extended maintenance intervals. Harmonics are decreased because generator 4 is running more efficiently at a proper load and the Battery System will improve the power quality. In prior art systems, because the diesel generators are bigger and run at lower loads, they tend to create more harmonics. The resulting harmonic vibrations cause more wear and tear on all the equipment used in the system.

Battery prices continue to decrease, meaning the new system will become even more economically advantageous in the future. The new system provides a better working environment and cleanliness; and maintenance risk is limited. When conducting drilling or production operations in remote areas or areas with unstable political situations, there is a concern for security of personnel. When maintenance personnel are sent to the site, they must be accompanied by security guards. Therefore, any decrease in maintenance requirements is doubly beneficial because of the security costs that are built into maintenance costs.

The new system is also more adaptable to remote monitoring and control if needed. Finally, lower overall costs could flatten the production curve decline and extend economic well production life by substantially reducing overall operating costs.

The subject matter of the present invention is described with specificity herein to meet statutory requirements. However, the description itself is not intended to necessarily limit the scope of claims. Rather, the claimed subject matter might be embodied in other ways to include different elements or combinations of elements similar to the ones described in this document, in conjunction with other present or future technologies.

The invention claimed is:

1. A system for supplying power to an electric submersible pump, said system comprising:
   a. a variable frequency drive electrically connected to a motor;
   b. said electric submersible pump mechanically connected said motor;
   c. a generator electrically connected to said variable frequency drive;
   d. a battery electrically connected to said variable frequency drive, said battery being sized to power said variable frequency drive during startup operations of said electric submersible pump and during generator maintenance periods;
   e. a means for detecting when power from said generator is insufficient to meet the load demand of said electric submersible pump, and then sending power from said battery to said variable frequency drive to meet said load demand of said electric submersible pump; and
   f. a means for charging said battery using said generator when said battery has dropped below a threshold level.

2. The system of claim 1, wherein said electric submersible pump is used in downhole oil production operations.

3. The system of claim 1, further comprising an inverter electrically connected intermediate said battery and said variable frequency drive.

4. The system of claim 1, wherein said generator is a 150 kVA generator and said battery is a 672 kW max power battery.

5. A method for supplying power to an electric submersible pump, said method comprising:
   a. Providing a system comprising:
      i. a variable frequency drive electrically connected to a motor;

ii. said electric submersible pump mechanically connected said motor;
iii. a generator electrically connected to said variable frequency drive;
iv. a battery electrically connected to said variable frequency drive, said battery being sized to power said variable frequency drive during startup operations of said electric submersible pump and during generator maintenance periods;
v. a means for detecting when power from said generator is insufficient to meet the load demand of said electric submersible pump, and then sending power from said battery to said variable frequency drive to meet said load demand of said electric submersible pump;
vi. and a means for charging said battery using said generator when said battery has dropped below a threshold level;
b. detecting when power from said generator is insufficient to meet the load demand of said electric submersible pump, and then sending power from said battery to said variable frequency drive to meet said load demand of said electric submersible pump; and
c. charging said battery using said generator when said battery has dropped below a threshold level.

6. The method of claim 5, wherein said electric submersible pump is used in downhole oil production operations.

* * * * *